United States Patent [19]

Dempsey et al.

[11] Patent Number: 4,814,608
[45] Date of Patent: Mar. 21, 1989

[54] SUBSOIL RADIOACTIVE GAS MEASURING SYSTEM

[75] Inventors: John C. Dempsey, Salamanca; Payasada Kotrappa, Olean, both of N.Y.

[73] Assignee: Rad Elec Inc., Frederick, Md.

[21] Appl. No.: 936,239

[22] Filed: Dec. 1, 1986

[51] Int. Cl.⁴ .......................... G01V 5/00; G01T 1/00
[52] U.S. Cl. .................................... 250/253; 250/255; 250/336.1
[58] Field of Search .................... 250/336.1, 253, 255; 307/400

[56] References Cited

U.S. PATENT DOCUMENTS 2,695,363  11/1954  Marvin ............................... 250/374
4,352,014   9/1982  Powell ............................... 250/253

OTHER PUBLICATIONS

Gupta et al., "Electret Personnel Dosemeter", Radiation Protection Dosimetry, 11(2), pp. 107-112, 1985.
Kotrappa et al., "Measurement of Potential Alpha Energy Concentration of Radon and Thoron Daughters Using on Electret Dosemeter", Radiation Protection Dosimetry, 5(1), pp. 49-56, 1983.

Primary Examiner—Carolyn E. Fields
Attorney, Agent, or Firm—Cushman, Darby & Cushman

[57] ABSTRACT

Radioactive gas, particularly radon, is measured in the subsoil environment by electrostatically charging one or two electrets and placing the electret(s) within a chamber having openings protected by a filter which permits gas to flow through the openings while preventing particles from flowing through the openings. The chamber with the electrostatically charged electret(s) and the detector is placed in a receiver formed within the hollow wall of an elongated probe. Foam cushions surround the chamber and assist in the filtering. An open material, such as steel wool, holds the foam in place and the next lower section of the probe holds the steel wool in place. When sampling is done at only one level, the next lower section is the soil moving nose of the probe. Holes in the side wall near the nose admit subsoil gas into the receiver. When it is desired to sample radioactive gas at several levels, additional sections of the probe have receivers for holding additional chambers and openings near the bottom of each section admit gas into the receivers. After leaving the probe in the soil for a predetermined period, the probe is removed and disassembled. The chamber is removed from the receiver and the surface charge on the detector is measured. Changes in the surface charge are compared with known relations between changes in surface in radioactive decay in the chamber to give amount of radioactive gas that has decayed in the chamber.

20 Claims, 5 Drawing Sheets

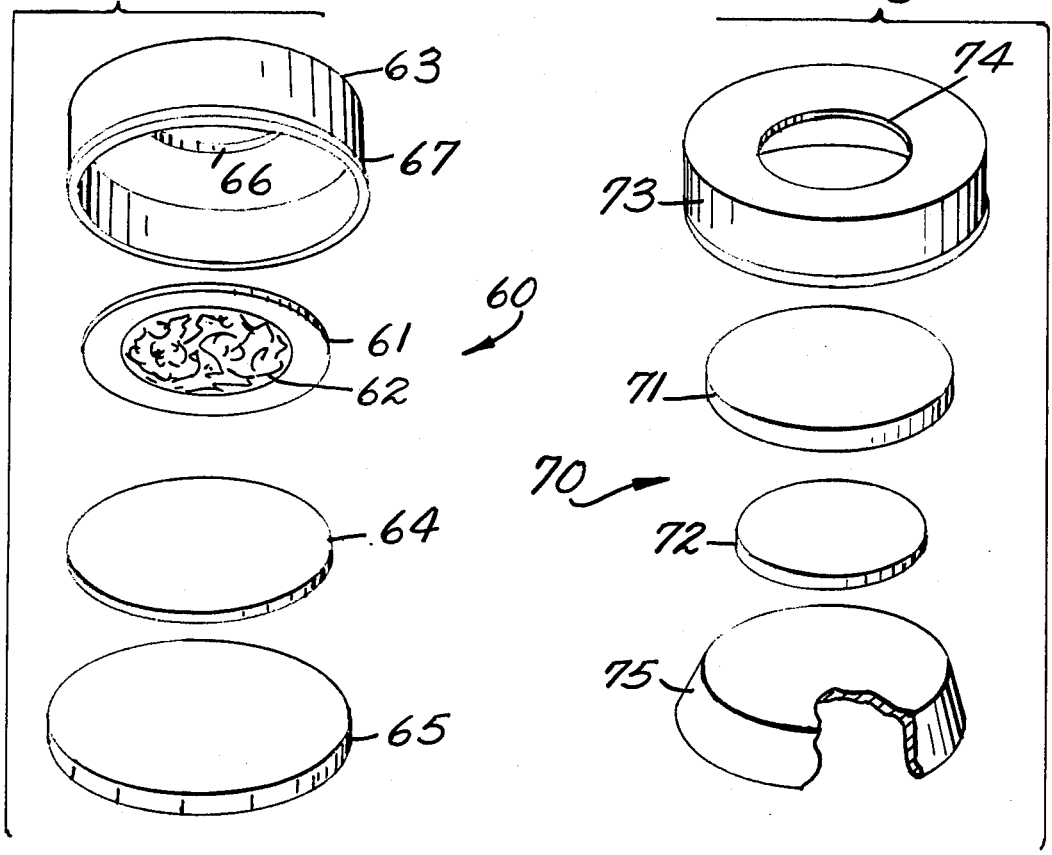
Fig. 3b.
Fig. 3c.
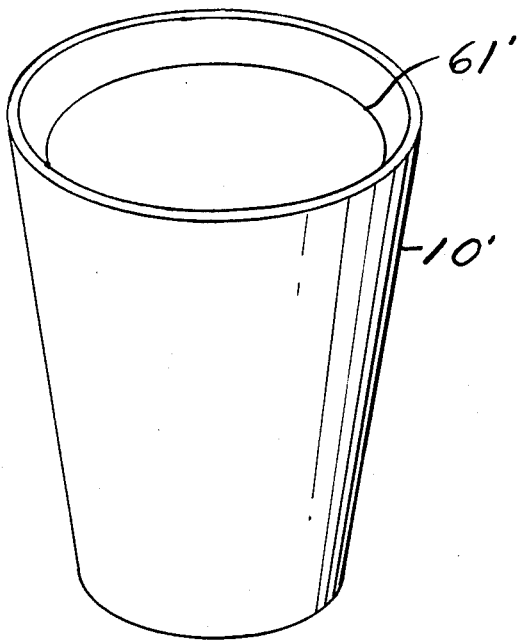
Fig. 3d.
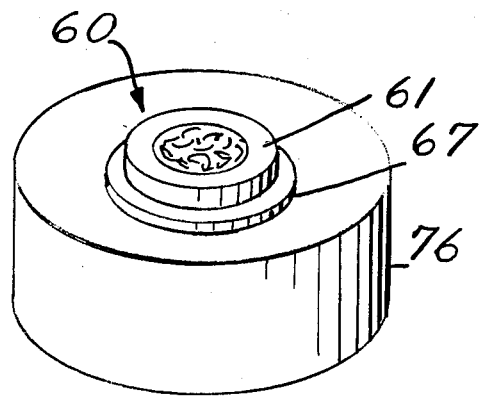
Fig. 3e.

SUBSOIL RADIOACTIVE GAS MEASURING SYSTEM

BACKGROUND OF THE INVENTION

Detecting the amount of radioactive gas in subsoil is useful. Radon detection is particularly useful when determining whether a site is suitable for improvement in buildings to be occupied as residences or offices by persons.

A need exists for samplers which may be left in place at specific depths below a soil surface and which may be readily removed and measured by direct readings.

SUMMARY OF THE INVENTION

The present invention uses the ionization chamber system for monitoring radioactive gas as described in the copending application Ser. No. 936,240 filed Dec. 1, 1986 by the same inventors.

The present invention is intended for subsurface measurement of radioactive gases, particularly radon.

Radioactive gas, particularly radon, is measured in the subsoil environment by electrostatically charging an electret and placing the electret within a chamber having openings protected by a filter which permits gas to flow through the openings while preventing particles from flowing through the openings. The chamber with the electrostatically charged electret and the detector is placed in a receiver formed within the hollow wall of an elongated probe. Foam cushions surround the chamber and assist in the filtering. An open material, such as steel wool, holds the foam in place and the next lower section of the probe holds the steel wool in place. When sampling is done at only one level, the next lower section is the soil moving nose of the probe. Holes in the side wall near the nose admit subsoil gas into the receiver. When it is desired to sample radioactive gas at several levels, additional sections of the probe have receivers for holding additional chambers and openings near the bottom of each section admit gas into the receivers. After leaving the probe in the soil for a predetermined period, the probe is removed and disassembled. The chamber is removed from the receiver and the surface charge on the detector is measured. Changes in the surface charge are compared with known relations between changes in surface charge and radioactive decay in the chamber to give amount of radioactive gas that has decayed in the chamber.

A preferred subsoil radioactive gas measuring device has a probe with a hollow body formed with a rigid wall. A cap at an upper end of the probe body receives force while driving the probe into a soil to be tested. A cone at a lower end of the probe body moves soil laterally while the probe is being driven into the soil. Openings in the probe admit gas from the soil. A chamber mounted in the body above the cone has openings for admitting gas from the soil into the chamber. A filter in the body adjacent the chamber openings permits passage of gas from the soil into the chamber and prevents passage of particles. A detector includes statically electrically charged electret means in the chamber for attracting oppositely charged ions and particles to the detector. The ions and charged particles are formed from decay of radioactive gas in the chamber. Charge of the detector is changed upon encounters of the attracted ions and charged particles with the detector.

The preferred apparatus further includes means for measuring changed charge of the detector.

Preferably, the chamber is removable from the probe body.

In a preferred embodiment, the filter is removable with the chamber.

Preferably, the cone is removable from the probe body.

In a preferred embodiment, the chamber fits within the body above the cone and is removable from the probe body with the cone.

Preferably, the openings is the probe body are positioned in the wall of the probe body near the cone.

A preferred subsoil radioactive gas measuring apparatus has a probe body and a testing chamber connected to the probe body. Openings in the testing chamber admit gas from the subsoil adjacent the probe body. A filter mounted adjacent the openings in the testing chamber prevents admission of particles into the testing chamber while permitting passage of gas into and out of the testing chamber. A detector including a statically electrically charged electret is in the chamber for attracting to the detector oppositely charged ions and particles which are formed from decay of radioactive gas in the chamber, whereby charge of the detector is changed upon encounters with the detector of the attracted ions and charged particles.

In the preferred apparatus, the probe comprises a cylindrical body having an upper cap for receiving force when moving the probe into the soil and having a lower nose assembly for moving into the soil as the probe is forced into the soil. The probe body having a wall with openings extending therethrough near a lower portion thereof. A plug spaced upward from a downward end of the wall forms a receiver. A cushion is positioned in the receiver adjacent the plug, and the chamber is positioned in the receiver adjacent the cushion. The filter means including a sponge diffusion barrier is positioned in the receiver adjacent the chamber and above holes leading through the wall of the chamber. An open support is positioned in the receiver adjacent the openings and adjacent the bottom of the wall for permitting gas to flow through the openings and through the receiver and sponge diffusion barrier and through the chamber openings into the chamber.

The preferred apparatus further has means for joining the wall at the bottom of the receiver to additional wall sections with receivers and plugs, cushions, barriers and chambers for measuring subsoil radioactive gas at varied positions.

The preferred method of measuring subsurface radioactive gas in soils comprises forcing a probe into a soil, flowing gas into a receiver in the probe, flowing gas through a filter means including a diffusion barrier into a testing chamber, permitting radioactive gas to decay in the testing chamber, attracting ions formed during the decay and charged particles formed during the decay toward a detector using an electret having a static charge opposite the charge of the ions and charged particles attracted to the detector, changing charge on a surface of the detector according to encounters by the surface with charged ions and particles attracted to the surface by the static charge and measuring the changed charge on the detector to determine radioactive gas in the subsoil.

The preferred method further comprises removing the probe from the soil and removing the chamber from the probe prior to measuring change of static charge on the surface of the detector.

The preferred method further comprises removing at least a portion of the detector from the chamber before measuring change in static charge on a surface of the detector.

The method preferably includes repelling charged ions and charged particles of particular charges from a section statically charged electret having a like polarity to the repelled ions and charged particles and having a polarity opposite to the polarity of the first mentioned electret.

In the preferred method the repelling comprises repelling the ions and charged particles from all inner parts of the chamber toward the detector.

The preferred method includes admitting gas from the subsurface soils into the probe through openings near a bottom of a wall section of a probe.

The preferred method further comprises holding a chamber in the probe with non-woven open material and a sponge diffusion barrier above a nose of the probe.

In one embodiment of the preferred method, plural probe tiers are joined together in axial relationship and gas is admitted into chambers positioned within all tiers.

DETAILED DESCRIPTION OF THE DRAWINGS

Figure 1:
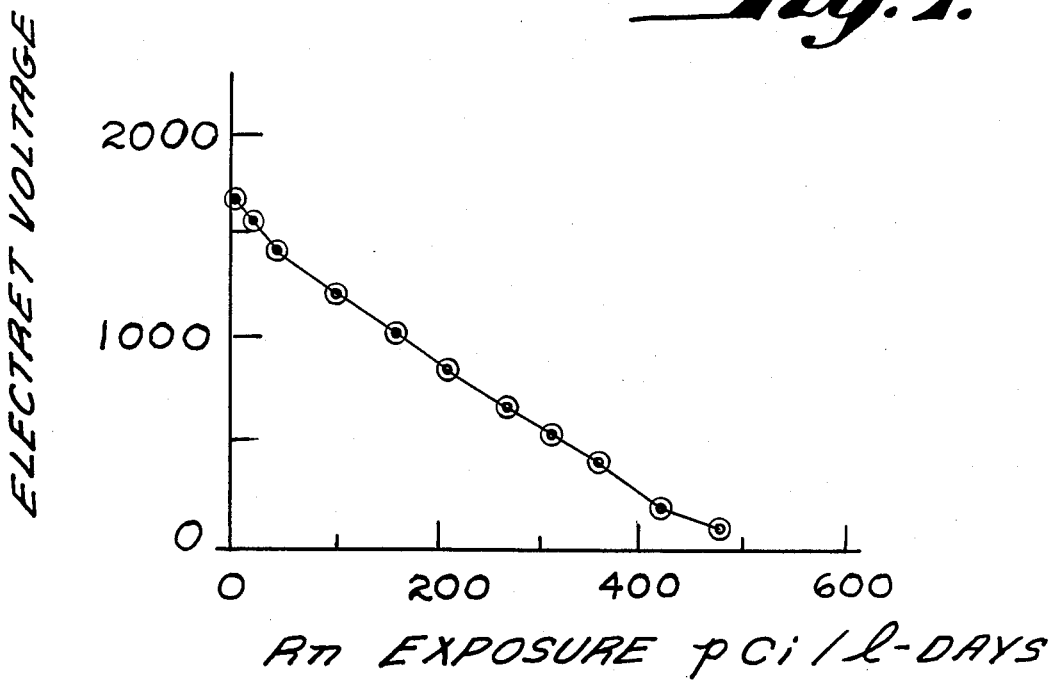
FIG. 1 is a curve showing change in detector voltage compared with radiation exposure denoted in pico curies per liter-days.
Figure 2:
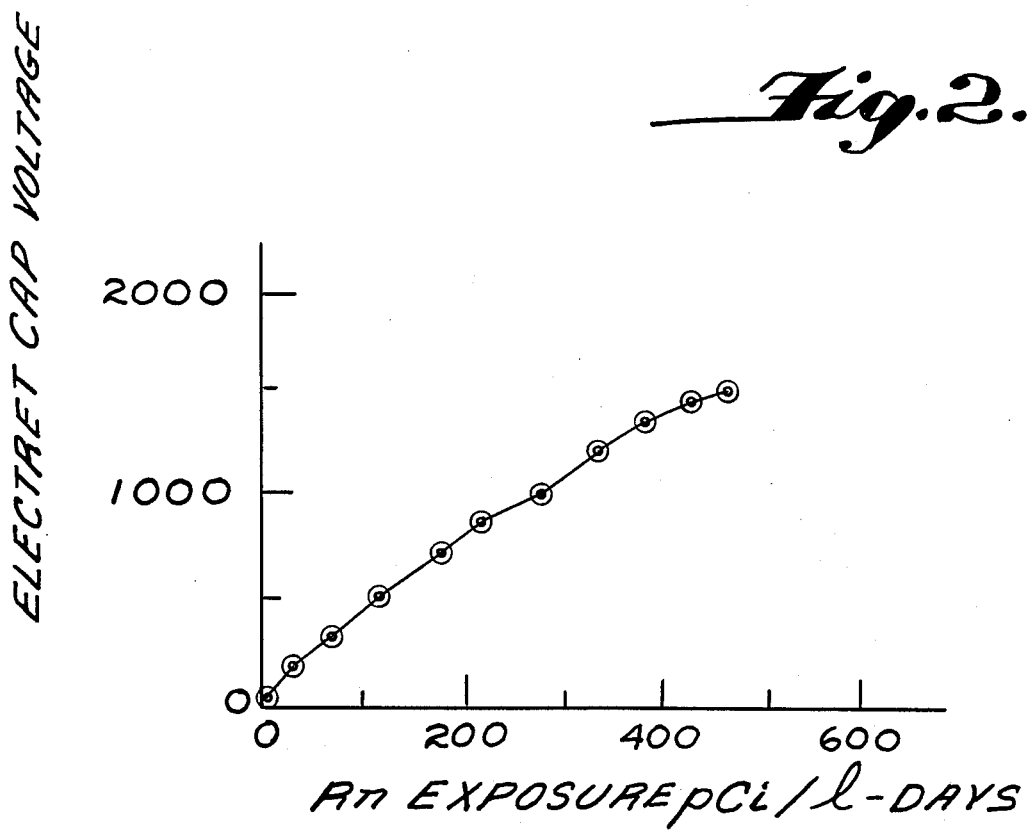
FIG. 2 shows a calibration curve of changes in electron cap voltage compared with radon exposure in pico curies per liter-days.

Referring to the drawings, FIGS. 1 and 2 show calibration curves for the chambers relating detector voltages changes to the radon concentration.

Figure 3:
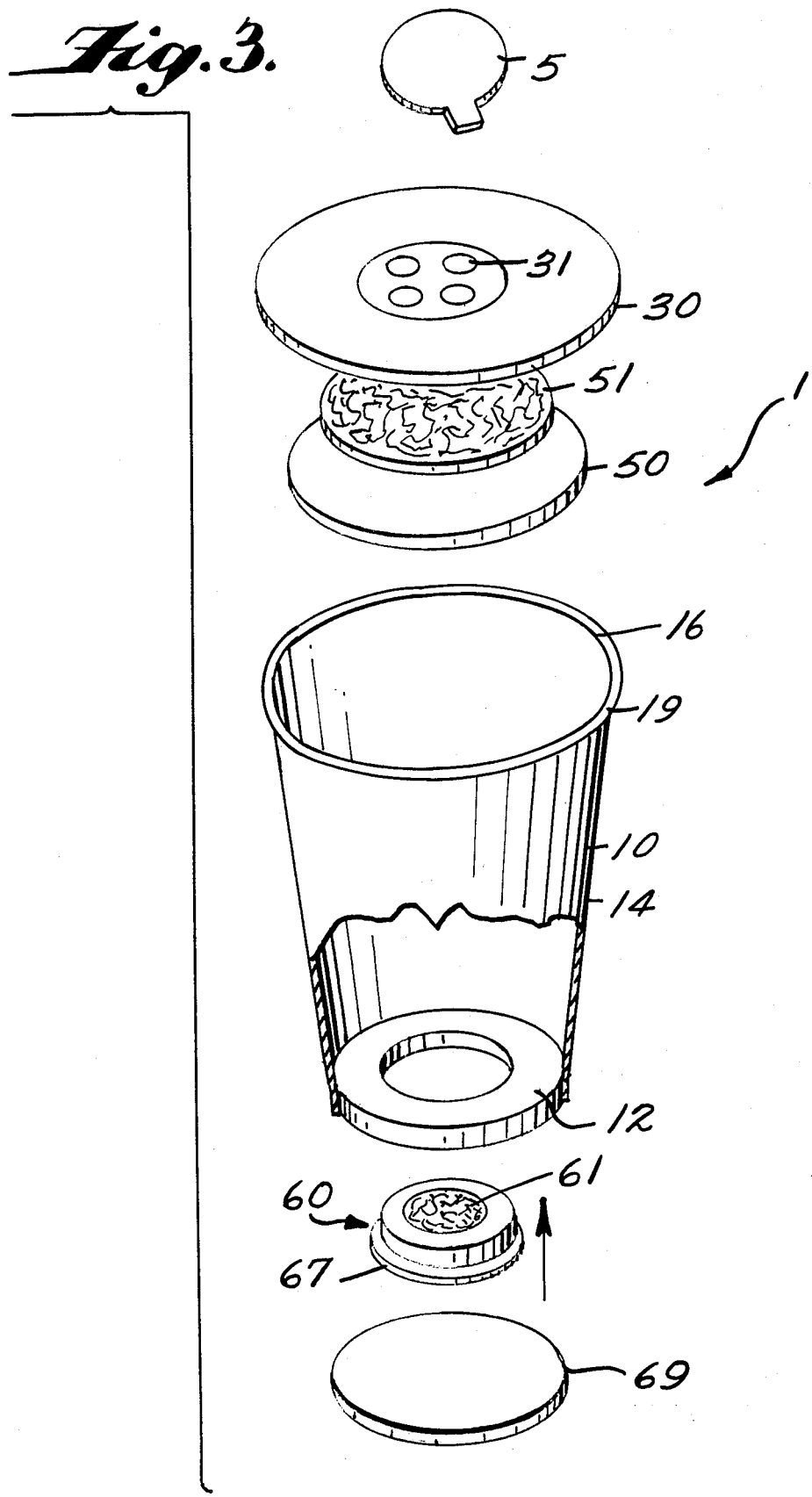
FIG. 3a is an exploded view, partically in section, of a chamber, cover and closure.
FIG. 3b is an exploded view, partically in section, of a detector assembly.
FIG. 3c is an exploded partially sectional view of an alternate detector assembly.
FIG. 3d shows a cup with a section electret.
FIG. 3e shows an electret charge measuring device.

In FIG. 3, a chamber is generally indicated by the numeral 1. The chamber includes a cup 10 with a base 12 in a side wall 14 having an upper edge 16 which is formed with a lip 19. Cover 30 has a side wall which engages the lip 19 to hold the cover 30 assembled on the cup 10. Openings 31 in a central area of the cup are covered by an adhesive label-type cover 5 with a tab for removal and replacement. A filter 50 is adhered to the inside of the cover surrounding the area of holes 31. A detector assembly 60 is placed on the bottom 12 of the cup. As shown in FIG. 3b, the detector assembly has an electrostatically charged electret 61 made of a charge-holding, non-conducting material such a s PTFE of 1 to 200 mls. thickness with a conductive metallic backing 62 which is electrically connected to the protector cup 63 by a metal foil 64 held in position on the friction fitted cardboard retainer disk 65 which is removed adhesively bonded to the chamber bottom 12. A hole 66 in the cover 63 permits access of the electrostatic charge on electret 61 to the interior of the chamber. Cup bottom 69 supports flange 67 of electret holder 60 upward in the base of the cup.

In an alternate embodiment shown in FIG. 3c, the detector 70 has a thin insulator cap 71 held above and in contact with the electret 72 by a cap holder 73. The cap is made of a material such as PTFE which has a high resistance. The electret 72 is bonded to the bottom of the electret holder 75 which fits inside of the holder 73 to bring the electret 72 into contact with a cap 71. A bonding holds the two holders 73 and 75 together and a bonding holds the holder 75 on the bottom of the cup 10.

As ions and charged electrostatic particles are attracted to electret 61 or to the cap 71, the charge on the detector changes. In the case of the embodiment shown in FIG. 3a, the charge on the electret diminishes. In the case of the embodiment shown in FIG. 3c, the particles and ions attracted toward electret 72 contact cap 71 and release their charge, which increases the charge on cap 71. After exposure, in the case of FIG. 3b, the electret charge may be measured while the holder 63 remains in the cup or the holder 63 with its base 65 may be pulled from the cup so that the changed charge on electret 61 may be measured and compared with the charge before exposure.

In the case of the detector shown in FIG. 3c, the holder 73 and its attached cap 71 may be removed from the cup and the charge on cap 71 may be measured. Since the charge on cap 71 starts at zero, no initial measurement is required. FIG. 3d shows a cup 10' with a second electret charged oppositely to the first electret. FIG. 3e shows an electret holder 60 positioned on the means for measuring charge 76.

In the embodiment with two electrets, ions and charged particles having the same polarity as one of the electrets are repelled from all inner surfaces of the chamber toward the detector.

Figure 4:
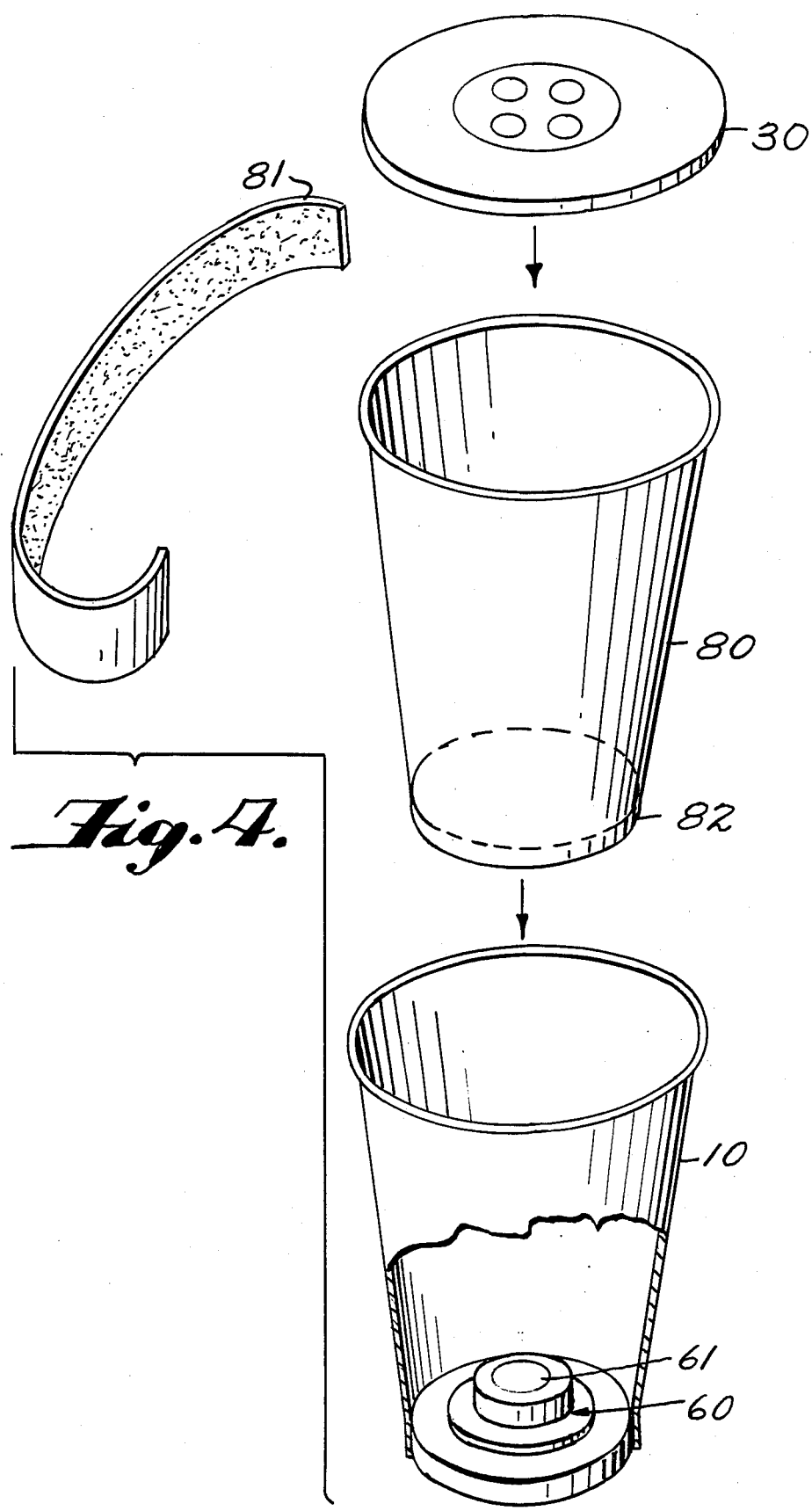
FIG. 4 is an exploded view partially in section of an alternate detection chamber.

In the embodiment shown in FIG. 4, an inner cup 80 is used. The tightly fitting cover 30 engages the upper lip on inner cup 80. The adhesive tape 81 is used to surround the two cups and hold then together. In use, cup 80 is first removed from the cup 10 and the cover 30 is placed on the cup 10 during measurement. After measurement, the inner cup 80 is replaced. purging substantially all of the air from cup 10 and the cover 30 is placed on top of cup 80 an the adhesive tape is placed around the upper lips of the cup to hold them together.

Either the entire cups may be measured with an electrostatic voltage measuring device at the site or the entire cups or the removed holders may be mailed to a remote place for measuring.

Figure 5:
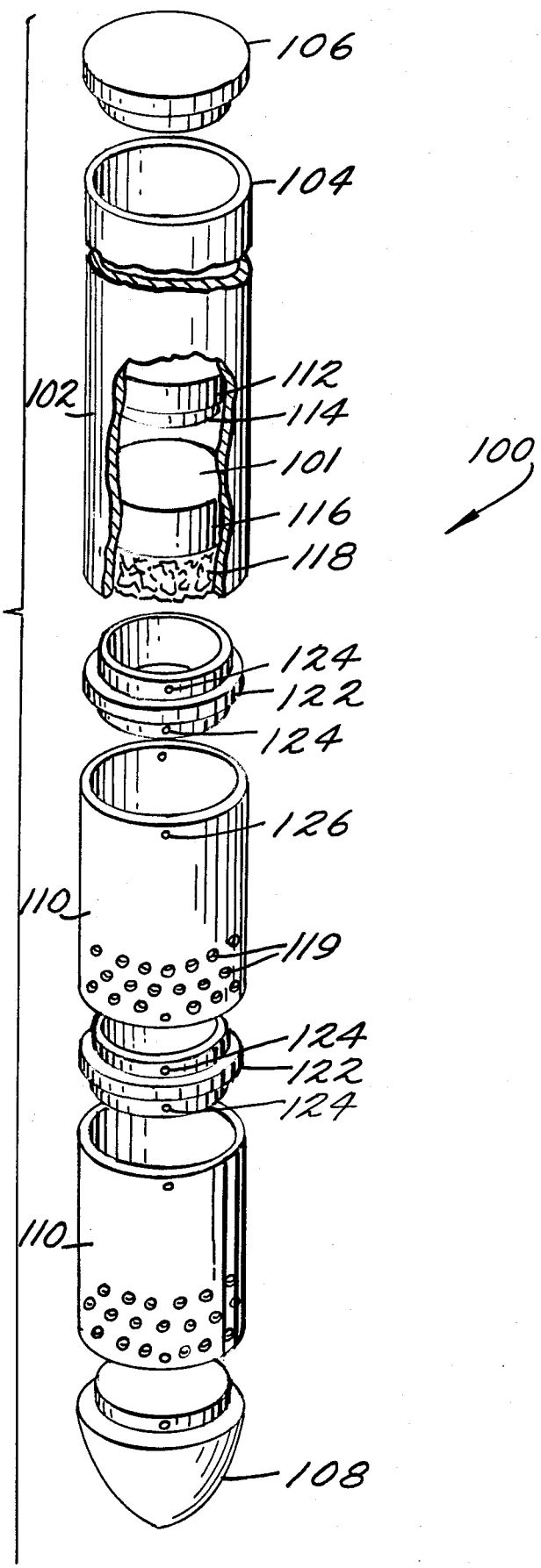
FIG. 5 is an exploded view partially in section of a soil probe of the present invention.

As shown in FIG. 5, a soil probe is generally indicated by the numeral 100. The probe has a body 102 made of a cylindrical rigid wall 104. An upper end of the body receives a hard steel cap 106 used for driving the probe into a loose soil. The lower end of the body 102 has a nose 108 used for penetrating the soil. Additional sections 110 of the body may be added to sample radioactive gas at different levels. Each of the sections has the same interior structure. A shown in cross-sectional view in the upper section, a plug 112 is fixed interiorly in the section to form a downward opening receiver. A sponge cushion 114 is placed against the plug and a sensing chamber 101 such as shown in FIG. 3a, 3b or 3c and 4 is placed in the receiver 111. A sponge diffusion barrier 116 is added beneath the chamber 101.

The barrier 116 forms part of the filtering system. Steel wool 118 is added beneath the barrier 116 to form a large open space inside of the vent holes 119. Spacers 120 are provided between adjacent sections. Each of the spacers has a radially extending center portion 122 and holes 124 which align with holes 126 and adjacent sections to receive spring roll pins to hold the structures assembled. Holes 124 extend through the spacers and align with diametrically opposed holes 126 so that spring pins may be driven into the aligned holes and may be driven out of the aligned holes.

After the probe is assembled and driven into the soil, it is left in the soil for a predetermined time, for example, several hours. Then the probes are removed rom the soil and disassembled to recover each chamber 101, which is also known as a perm. The chambers are then opened and the surface charges on the detectors are measured. Alternatively, the chambers are mailed or transported intact to remote locations or the detectors are removed and transmitted or mailed to remote locations for measuring the surface voltage charge on the detectors.

While the invention has been described with a specific embodiment, modifications and variations of the invention may be made without departing from the scope of the invention which is defined in the following claims.

We claim:

1. A subsoil radioactive gas measuring apparatus comprising a probe having a hollow body surrounded by a rigid wall, cap means at an upper end of the probe body for receiving force upon the cap means while driving the probe into a soil to be tested, a cone means at a lower end of the probe body for moving soil laterally while the probe is being driven into soil openings in the probe while the cap means receives force from the soil into the chamber, filter means in the body adjacent the chamber openings for permitting passages of gas from the soil into the chamber and for preventing passage of particles, a detector including statically electrically charged electret means in the chamber for attracting oppositely charged ions and particles to the detector, when ions and charged particles are formed from decay of radioactive gas in the chamber, wherein charge of the detector is changed upon encounters of the attracted ions and charged particles with the detector.

2. The apparatus of claim 1 further comprising means for measuring changed charge of the detector.

3. The apparatus of claim 1 wherein the chamber is removable from the probe body.

4. The apparatus of claim 3 wherein the filter means is removable with the chamber.

5. The apparatus of claim 3 wherein the cone is means is removable from the probe body.

6. The apparatus of claim 5 wherein the probe fits within the body above the cone means and is removable from the probe body with the cone means.

7. The apparatus of claim 1 wherein the openings in the probe body are positioned in the wall of the probe body spaced upwardly from the cone means.

8. A subsoil radioactive gas measuring apparatus comprising a probe body, a testing chamber connected to the probe body, openings in the testing chamber for admitting gas from the subsoil adjacent the probe body and filter means mounted adjacent the openings in the testing chamber for preventing admission of particles into the testing chamber while permitting passage of gas into and out of the testing chamber and a detector including statically electrically charged electret means in the chamber for attracting oppositely charged ions and particles to the detector, when ions and charged particles are formed from decay of radioactive gas in the chamber, wherein charge of the detector is changed upon encounters of the attracted ions and charged particles with the detector.

9. The apparatus of claim 8 wherein the probe comprises a cylindrical body having an upper cap means for receiving force for moving the probe into the soil and having a lower nose assembly means for moving into the soil as the probe is forced into the soil, the probe body having a wall with openings extending therethrough near a lower portion thereof, a plug spaced upward from a downward surface of the wall for forming a receiver, a cushion positioned in the receiver adjacent the plug, and the chamber being positioned in the receiver adjacent the cushion, the filter means, including a sponge diffusion barrier, positioned in the receiver adjacent the chamber and above holes leading through the wall of the chamber and a open support positioned in the receiver adjacent the openings and adjacent the bottom of the wall for permitting gas to flow through the openings and through the receiver and sponge diffusion barrier and through the chamber openings.

10. The apparatus of claim 9 further comprising means for joining the wall at the bottom of the receiver to additional wall sections with receivers and plugs, cushions, barriers and chambers for measuring subsoil radioactive gas at varied positions.

11. The apparatus of claim 8 further comprising a cup-like purging chamber fitting within the testing chamber for purging gas from the testing chamber while the testing chamber is being stored or transported as distinguished from used.

12. The method of measuring subsurface radioactive gas in soils comprising forcing a probe into a soil, flowing gas into a receiver in the probe, flowing gas through a filter means including a diffusion barrier into a testing chamber, permitting radioactive gas to decay in the testing chamber, attracting ions formed during the decay and charged particles formed during the decay toward a detector which includes an electret having a static charge opposite the charge of the ions and charged particles attracted to the detector, changing charge on a surface of the detector according to encounters by the surface with charged ions and particles attracted to the surface by the static charge and measuring the changed charge on the detector to determine radioactive gas in the subsoil.

13. The method of claim 12 further comprising removing the probe from the soil and removing the chamber from the probe prior to measuring change of static charge on the surface of the detector.

14. The method of claim 13 further comprising removing at least a portion of the detector from the chamber before measuring change in static charge on a surface of the detector.

15. The method of claim 13 further comprising placing a cup-like purging chamber inside the testing chamber after removing the testing chamber from the probe and thereby purging gas from the testing chamber.

16. The method of claim 12 further comprising admitting gas from the subsurface soils into the probe through openings near a bottom of a wall section of a probe.

17. The method of claim 16 further comprising holding a chamber in the probe with non-woven open material and a sponge diffusion barrier above a nose of the probe.

18. The method of claim 12 further comprising joining plural probe tiers together in axial relationship and admitting gas into chambers positioned within all tiers.

19. The method of measuring subsurface radioactive gas in soils comprising forcing a probe into a soil, flowing gas into a receiver in the probe, flowing gas through a filter means including a diffusion barrier into a test chamber, permitting radioactive gas to decay in the testing chamber, attracting ions formed during the decay and charged particles formed during the decay toward a detector which includes an electret having a static charge opposite the charge of the ions and charged particles attracted to the detector, changing charge on a surface of the detector according to encounters by the surface with charged ions and particles attracted to the surface by the static charge, repelling charged ions and charged particles of particular charges from a second statically charged electret having a like polarity to the repelled ions and charged particles and having a polarity opposite to the polarity of the first mentioned electret, and measuring the changed charge on the detector determined radioactive gas is the subsoil.

20. The method of claim 19 wherein the repelling comprises repelling the ions and charged particles from all inner surfaces of the chamber toward the detector.

* * * * *